US012770286B2

(12) United States Patent
Yoshimura et al.

(10) Patent No.: US 12,770,286 B2

(45) Date of Patent: Oct. 20, 2026

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventors: Shozo Yoshimura, Kanagawa (JP); Masakazu Fujiki, Kanagawa (JP); Kazuhiko Kobayashi, Kanagawa (JP); Makoto Tomioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 18/733,627

(22) Filed: Jun. 4, 2024

(65) Prior Publication Data

US 2024/0412403 A1 Dec. 12, 2024

(30) Foreign Application Priority Data

Jun. 12, 2023 (JP) ................................ 2023-096311

(51) Int. Cl.
*G06T 7/70* (2017.01)

(52) U.S. Cl.
CPC .................................... *G06T 7/70* (2017.01)

(58) Field of Classification Search
CPC ... G06T 7/70; G06T 7/73; G06T 2207/30244; G06T 2207/10028; G06T 2207/30204; G06T 7/74; G06T 2207/20081; G06T 2207/20084; G06T 2207/30196; G06T 7/50; G06T 15/205; G06T 17/00; G06T 2207/10012; G06T 2207/30164; G06F 3/011; G06F 3/012; G06F 3/017; G06F 3/013

See application file for complete search history.

(56) References Cited

U.S. PATENT DOCUMENTS

| | | | | |
|---|---|---|---|---|
| 10,024,668 | B2 * | 7/2018 | Takeuchi | G01S 17/931 |
| 11,451,746 | B1 * | 9/2022 | Graybill | G06T 15/205 |
| 11,768,546 | B1 * | 9/2023 | Poulos | G06F 3/0346 345/156 |

(Continued)

FOREIGN PATENT DOCUMENTS

| | | |
|---|---|---|
| JP | 2019517701 A | 6/2019 |

*Primary Examiner* — Michael S Osinski

(74) *Attorney, Agent, or Firm* — Canon U.S.A., Inc., IP Division

(57) ABSTRACT

An information processing device includes: a disposition knowledge acquisition unit configured to acquire disposition knowledge information including type information that indicates types of two or more observation targets observed by an observer and positional relationship information between the observation targets; an inter-object positional relationship recognition unit configured to recognize an object type and a positional relationship in the disposition knowledge information; an observation position and orientation recognition unit configured to recognize an observation position and orientation that are a position and an orientation of observation at a time point at which the disposition knowledge information is generated; and a spatial positional relationship calculation unit configured to calculate spatial positional information between two or more of the observation targets based on the positional relationship and the observation position and orientation.

7 Claims, 6 Drawing Sheets

(56) References Cited

U.S. PATENT DOCUMENTS

| | | | | |
|---|---|---|---|---|
| 11,967,107 | B2 * | 4/2024 | Takemoto | G06T 7/579 |
| 2008/0266416 | A1 * | 10/2008 | Kobayashi | G06T 7/73 348/222.1 |
| 2011/0150286 | A1 * | 6/2011 | Ishigami | G06T 7/77 382/106 |
| 2012/0293608 | A1 * | 11/2012 | Doepke | H04N 23/698 348/36 |
| 2012/0321173 | A1 * | 12/2012 | Mitarai | G06T 7/73 382/154 |
| 2013/0121528 | A1 * | 5/2013 | Ikenoue | G06F 3/005 382/103 |
| 2017/0039718 | A1 * | 2/2017 | Kotake | G06T 7/73 |
| 2017/0069137 | A1 * | 3/2017 | Imoto | G06V 20/20 |
| 2018/0025249 | A1 * | 1/2018 | Liu | G06F 18/2431 382/158 |
| 2018/0144497 | A1 * | 5/2018 | Hirota | G06T 7/73 |
| 2018/0321776 | A1 * | 11/2018 | Averyanov | G06F 3/048 |
| 2019/0371000 | A1 * | 12/2019 | Suzuki | H04N 23/695 |
| 2020/0145778 | A1 * | 5/2020 | Laaksonen | H04S 7/304 |
| 2021/0104052 | A1 * | 4/2021 | Hayashi | G06T 7/248 |
| 2022/0137626 | A1 * | 5/2022 | Ohira | G01S 17/89 701/300 |
| 2023/0251106 | A1 * | 8/2023 | Furihata | G01C 21/3837 348/46 |
| 2023/0267646 | A1 * | 8/2023 | Hayashi | B25J 9/1697 382/103 |
| 2023/0283976 | A1 * | 9/2023 | Ninan | H04S 7/304 381/303 |
| 2023/0351706 | A1 * | 11/2023 | Babinowich | G06T 7/579 |
| 2023/0360265 | A1 * | 11/2023 | Kashitani | G06T 7/73 |
| 2023/0386075 | A1 * | 11/2023 | Hayashi | B25J 9/1697 |
| 2025/0076971 | A1 * | 3/2025 | Spencer | G06F 3/012 |
| 2025/0336086 | A1 * | 10/2025 | Park | G06F 18/00 |

* cited by examiner

INFORMATION PROCESSING DEVICE, INFORMATION PROCESSING METHOD, AND STORAGE MEDIUM

BACKGROUND OF THE DISCLOSURE

Field of the Disclosure

The present disclosure relates to an information processing device, an information processing method, and a storage medium.

Description of the Related Art

Image recognition enables a machine to recognize object features such as a type of object and a position of the object captured in an image. In Published Japanese Translation No. 2019-517701 of the PCT International Publication, a database is updated so that a type of object and a bounding box surrounding the object are output from an image.

In Literature 1 ("CNN-SLAM: Real-time dense monocular SLAM with learned depth prediction" Tateno et. al, CVPR2019), a 3-dimensional shape model is labeled based on detected object type information. In Literature 2 ("I2T: Image Parsing to Text Description," IEEE, B. Z. Yao, X. et. al, IEEE), a relationship between objects included in an image is described in a sentence based on object type information.

However, a positional relationship between objects or types of objects can be erroneously recognized in image recognition. There is also a problem that it takes time to prepare a recognition model for executing such a recognition process.

SUMMARY OF THE DISCLOSURE

An information processing device includes at least one processor or circuit configured to function as: a disposition knowledge acquisition unit configured to acquire disposition knowledge information including type information that indicates types of two or more observation targets observed by an observer and positional relationship information between the observation targets; an inter-object positional relationship recognition unit configured to recognize an object type and a positional relationship in the disposition knowledge information; an observation position and orientation recognition unit configured to recognize an observation position and orientation that are a position and an orientation of observation at a time point at which the disposition knowledge information is generated; and a spatial positional relationship calculation unit configured to calculate spatial positional information between two or more of the observation targets based on the positional relationship and the observation position and orientation.

Further features of the present disclosure will become apparent from the following description of embodiments with reference to the attached drawings.

DESCRIPTION OF THE EMBODIMENTS

Figure 1:
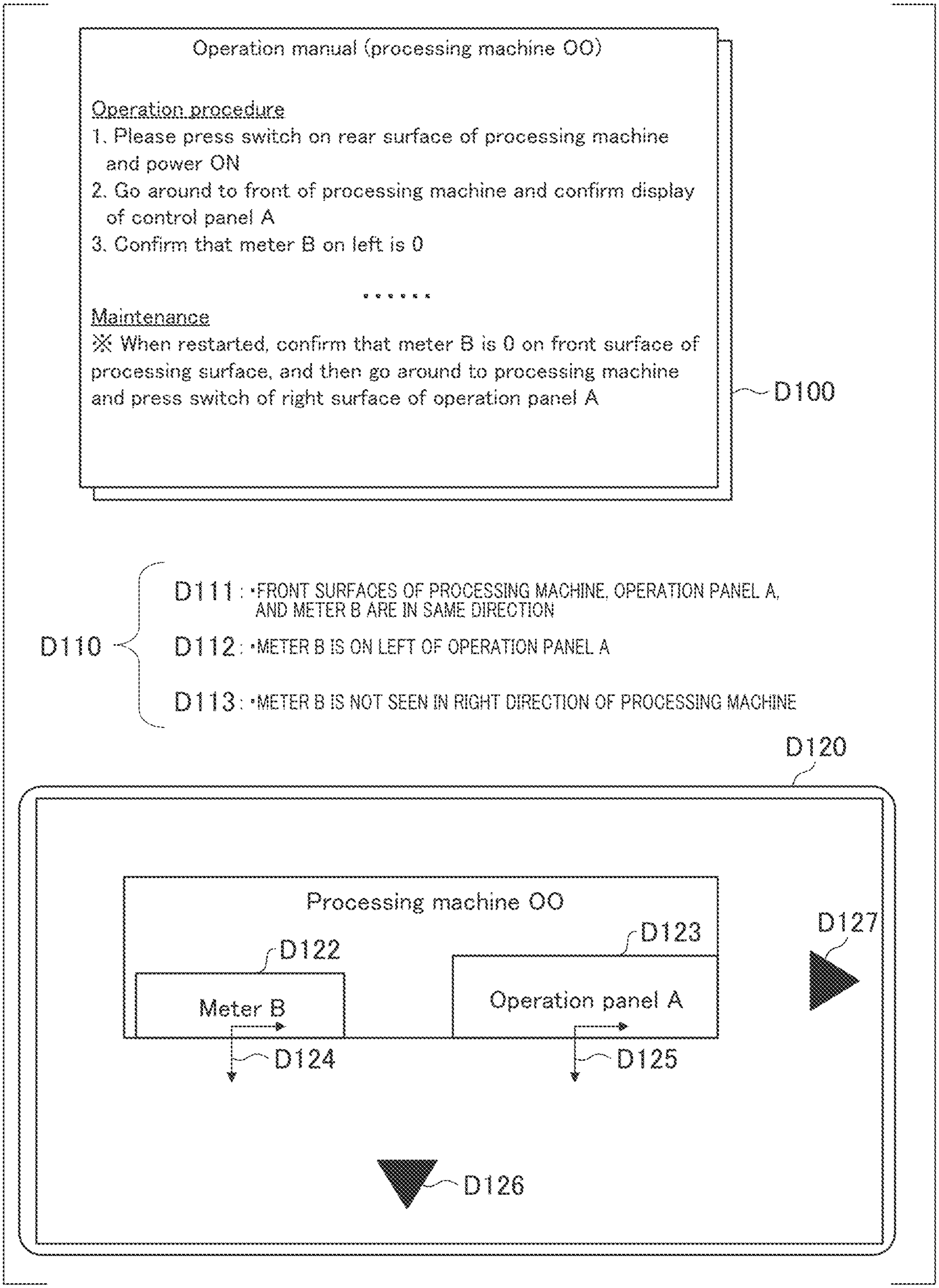
FIG. 1 is a diagram illustrating a specific example of a process of calculating a spatial positional relationship from a positional relationship between the objects included in sentence data.

Hereinafter, with reference to the accompanying drawings, favorable modes of the present disclosure will be described using Embodiments. In each diagram, the same reference signs are applied to the same members or elements, and duplicate description will be omitted or simplified.

First Embodiment

Three-dimensional space recognition is used for purposes such as recognition of types of objects, ascertainment of positions, and counting of the number of objects and is applied to various tasks such as recognition of places, avoidance of obstacles in automated driving, and prediction of dangers.

Object detection from images or three-dimensional shape models is realized by, for example, a neural network for selecting regions of interest (rectangles) and determining types of objects included in the regions of interest. However, previous object detection is specialized to detect individual objects.

That is, relationships between objects (in particular, a positional relationship) have not been used. For example, it is common sense that, for example, it is common for chairs to be next to desks rather than being on the tops of desks, and it is common for desks to be found indoors rather than outdoors. Such disposition features of objects have often been neglected in recognition of computers.

The disposition features in the present embodiment are features that describes a relationship between objects such as a combination pattern or an appearance frequency of a positional relation or a contact relation between objects in a real space, a temporal change or an occurrence probability.

Since such disposition features include object type information and positional relationship information, it takes time to generate a recognition scheme or a recognition model in which the disposition features are taken into account in terms of data generation.

Accordingly, in the present embodiment, object type information and positional relationship information are generated by collecting document information. The document information is data that includes sentences such as document and news articles and data generated for purpose of being read, viewed, or heard by people.

Since such document information include object names or positional relationship phrases included in sentences, the object type information and the positional relationship information can be generated. On the other hand, disposition relationship information in a space is not sufficiently included in document information in some cases.

For example, in a sentence in which a positional relationship between objects is expressed, a landscape is projected to an observation point in some cases. The observation point is a relative position and orientation between an object and an observer (a writer of a sentence) when a type of object or disposition information is observed. In a projection stage, three-dimensional positional relationship information is lost. Therefore, when disposition feature information of an object is generated from a sentence, conversion into the three-dimensional positional relationship information and generation of disposition information are necessary.

Accordingly, in the present embodiment, spatial positional relationship information is calculated from positional relationship information including document information. That is, an observation position and orientation are recognized from the document information and spatial positional relationship information position between objects is calculated from a positional relationship between recognized observation points.

FIG. 1 is a diagram illustrating a specific example of a process of calculating a spatial positional relationship from a positional relationship between the objects included in sentence data. In FIG. 1, D100 denotes sentence data and D110 (D111 to D113) denotes a disposition relationship between objects collected from the sentence data. D120 denotes a spatial disposition relationship generated from D110.

In FIG. 1, from the disposition relationships D111 and D112, it can be recognized that a meter B and an operation panel A included in the sentence are disposed side by side horizontally, but it cannot be determined whether the meter B is positioned in front of or behind the operation panel A.

Contradiction may occur when only information regarding the disposition relationships is used, including D113. In the present embodiment, observation positions and orientations (D126 and D127) are recognized including context and organization of the sentence. Specifically, in the sentence data D100, in the chapter “Operation Procedure,” there is the description “Go around to front of processing machine,” and it can be recognized that, subsequently, description is written on the assumption of facing the front of the processing machine, as in D126.

In the chapter “Maintenance,” since there is the description “Go around, ~ to right surface side,” it can be recognized that, subsequently, the description is on the assumption of a processing machine being faced from the right of the processing machine, as in D127. A spatial disposition relationship of the operation panel A and the meter B is calculated from the observation position and orientation, and the disposition relationships of D110, D126, and 127.

As in the above FIG. 1, in the present embodiment, a relationship between the observation positions is recognized from object type information and positional relationships included in document information, and a spatial positional relationship between objects is calculated. In the present embodiment, input data in an object disposition feature database in which a “disposition relationship between objects” of a real space is aggregated is generated. In the present embodiment, in particular, a method of generating object disposition feature data in which dependency on an observation point is removed from a disposition relationship that has observation point dependency will be described.

Figure 2:
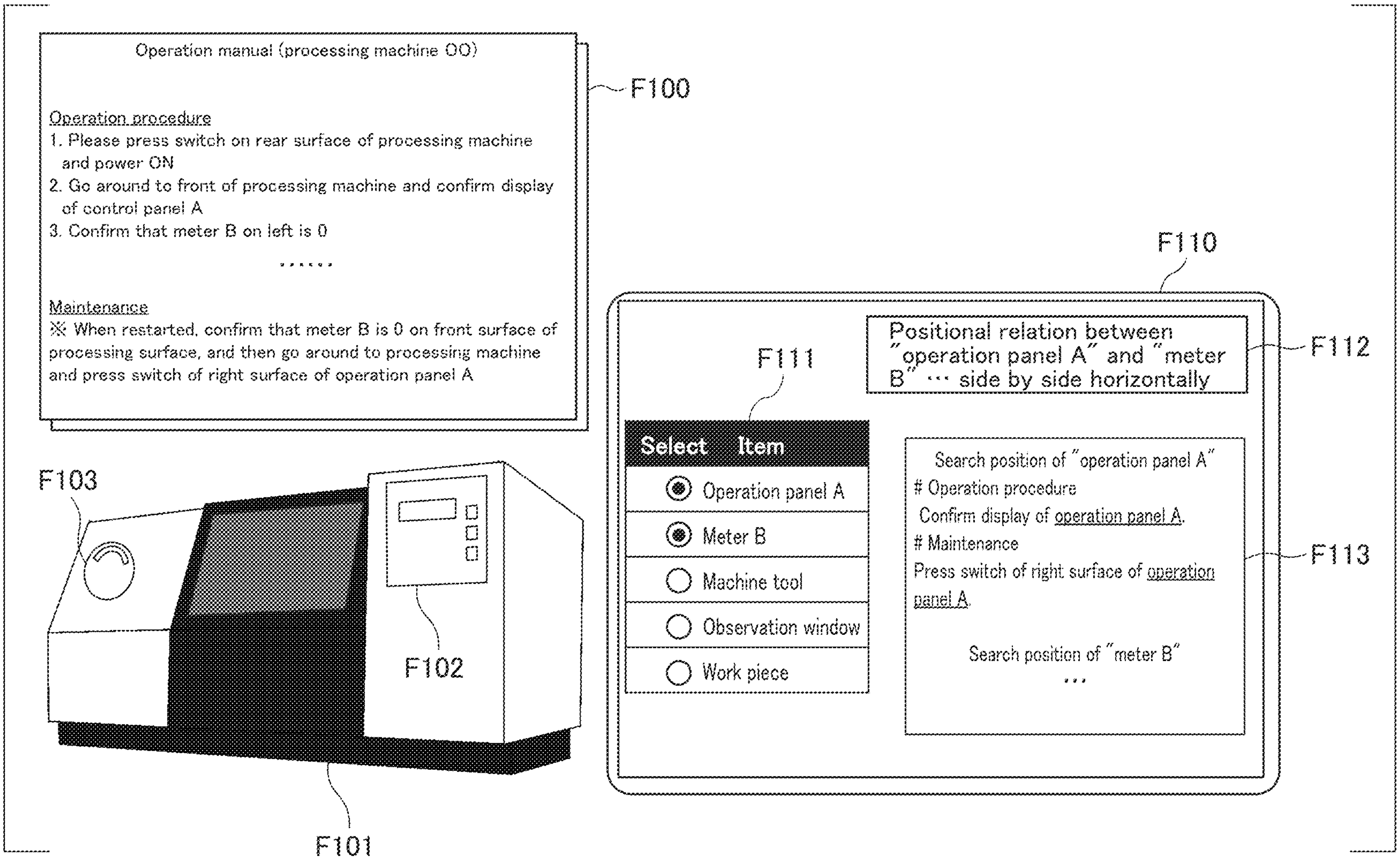
FIG. 2 is a diagram illustrating a usage situation example of an information processing device according to a first embodiment.

FIG. 2 is a diagram illustrating a usage situation example of an information processing device according to a first embodiment. F100 denotes a sentence of an operation manual for a processing device F101. The processing device F101 includes an operation panel F102 and a meter F103. F110 denotes a tablet serving as an information processing device according to the present embodiment, and calculates and displays a spatial positional relationship between objects from sentence data.

An object selection region F111, a calculation result display region F112, and a search result display region F113 are displayed on a display of the tablet F110. The object selection region F111 is a region in which an object name of a target of a positional relationship confirmed by a user is selected and displayed.

The calculation result display region F112 is a region in which the user displays a spatial positional relationship in a sentence expression for an object selected in the object selection region F111. The search result display region F113 is a region in which part of a sentence used for the calculation is displayed.

Figure 3:
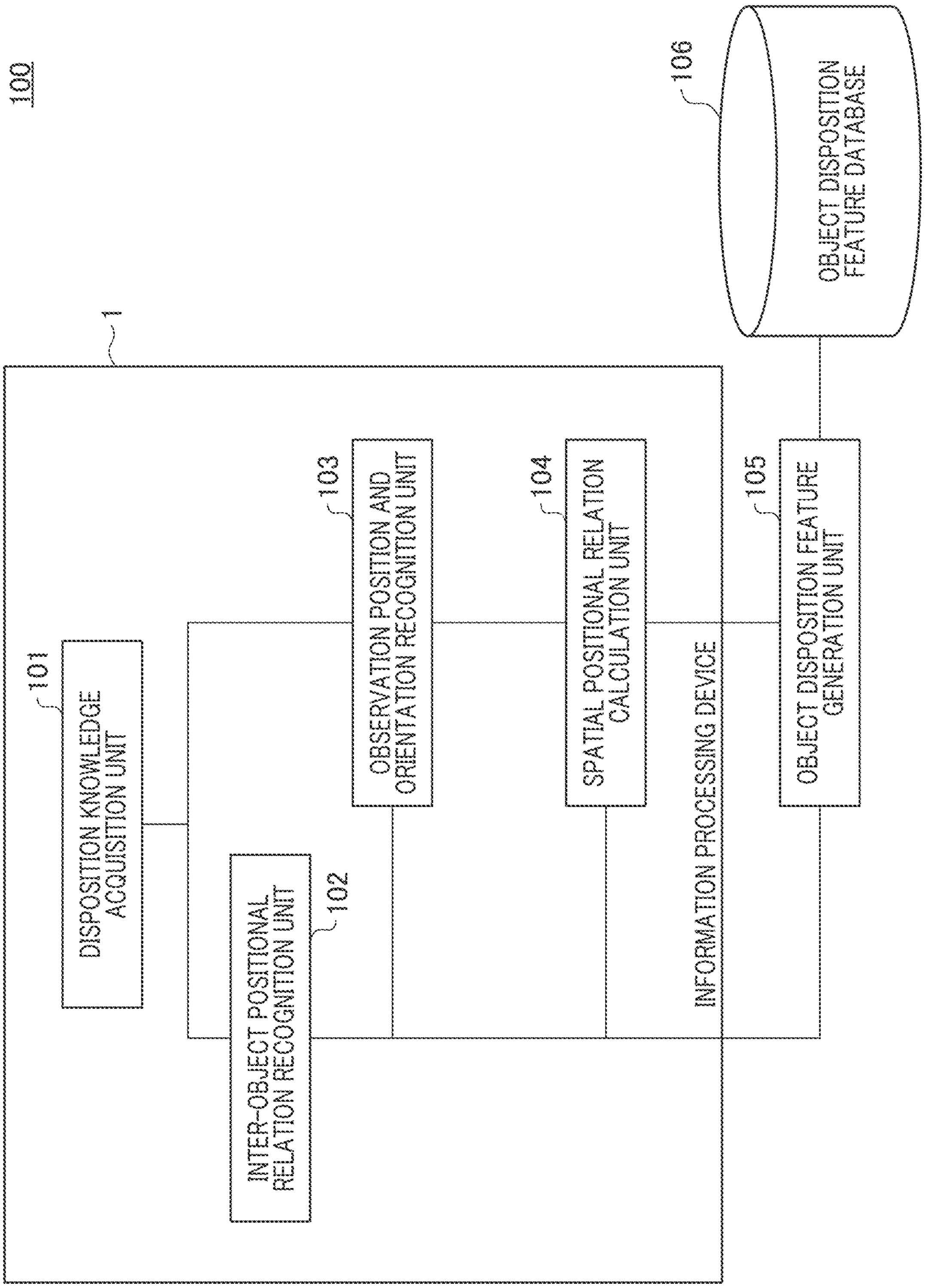
FIG. 3 is a functional block diagram illustrating a configuration example of an information processing system 100 according to the first embodiment.

FIG. 3 is a functional block diagram illustrating a configuration example of an information processing system 100 according to the first embodiment. Some of the functional blocks illustrated in FIG. 3 are realized by causing a CPU or the like serving as a computer included in the information processing system 100 to execute a computer program stored in a memory serving as a storage medium.

However, some or all of the functional blocks may be realized by hardware. As the hardware, a dedicated circuit (ASIC), a processor (reconfigurable processor or DSP), or the like can be used. Each functional block illustrated in FIG. 5 may not be contained in the same casing or may be configured with another device connected via a signal line.

The information processing system 100 includes an information processing device 1, an object disposition feature generation unit 105, and an object disposition feature database 106. The information processing device 1 includes a disposition knowledge acquisition unit 101, an inter-object positional relationship recognition unit 102, an observation position and orientation recognition unit 103, and a spatial positional relationship calculation unit 104.

The disposition knowledge acquisition unit 101 acquires data including positional relationship information between objects and object type information based on document information (sentence data or the like) (not illustrated) retained in a retention unit (not illustrated), and supplies the data to the inter-object positional relationship recognition unit 102 and the observation position and orientation recognition unit 103.

That is, the disposition knowledge acquisition unit 101 acquires disposition knowledge information including type information indicating types of two or more observation targets and positional relationship information between the observation targets which are observed by the observer.

The inter-object positional relationship recognition unit 102 recognizes the object type information and the positional relationship information based on data including the object type information and the positional relationship information supplied from the disposition knowledge acquisition unit 101. That is, the inter-object positional relationship recognition unit 102 recognizes types of objects and a positional relationship in the disposition knowledge information.

A recognition result is input to the observation position and orientation recognition unit 103 and the spatial positional relationship calculation unit 104. The positional relationship recognized by the inter-object positional relationship recognition unit 102 according to the present embodiment is a relative position or a relative orientation between a plurality of objects.

The observation position and orientation recognition unit 103 recognizes an observation position and orientation based on the data input by the disposition knowledge acquisition unit 101 and the object type information and the positional relationship information input by the inter-object positional relationship recognition unit 102. That is, the observation position and orientation recognition unit 103 recognizes the observation position and orientation that are a position and orientation of observation at a time point at which the disposition knowledge information is generated.

A recognition result by the observation position and orientation recognition unit 103 is input to the spatial positional relationship calculation unit 104. Here, the observation position and orientation are a positional relationship between an observer and an observation target recognized based on the data including the object type information and the positional relationship information supplied from the disposition knowledge acquisition unit 101.

The spatial positional relationship calculation unit 104 calculates a spatial positional relationship based on the object type information and the positional relationship information input from the inter-object positional relationship recognition unit 102, and the observation position and orientation input from the observation position and orientation recognition unit 103. That is, the spatial positional relationship calculation unit 104 calculates spatial position information between two or more observation targets based on the positional relationship and the observation position and orientation.

The spatial positional relationship is a spatial positional relationship in which a positional relationship is not changed irrespective of the observation position and orientation and there is no observation point dependency. That is, the spatial positional relationship calculation unit 104 calculates a positional relationship that does not depend on the observation position and orientation. The spatial positional relationship calculation unit 104 inputs the positional relationship between the objects generated from the types of objects and the spatial positional relationship to the object disposition feature generation unit 105.

The object disposition feature generation unit 105 generates object disposition information formed from the object type information and the spatial positional relationship information input from the spatial positional relationship calculation unit 104, and inputs the object disposition information to the object disposition feature database 106.

The object disposition feature database 106 is a database that retains a disposition feature indicating a positional relationship between a plurality of objects. The disposition feature is knowledge data obtained by generalizing a positional relationship between objects in a space.

The object disposition feature database 106 according to the present embodiment is a pre-trained neural network trained so that unknown or wrong object feature information is predicted from surrounding object feature information.

As the pre-trained neural network, for example, a transformer described in Literature 3 ("Attention is All you Need," Ashish. et. el Neural IPS2017) is used. That is, for example, a pre-trained neural network or the like in which the transformers of twenty four layers are superimposed is used.

In the present embodiment, an encoder network or the like in which the number of input dimensions and the number of output dimensions of the transformers is 512 dimensions, that is, a maximum of 512 pieces of object feature information are input, and an output of 512 dimensions that is the same number is obtained, is used.

Specifically, an encoder network or the like described in Literature 4 (Jacob. et. al, BERT: Pre-training of Deep Bidirectional Transformers for Language Understanding, arXiv 2018) is used.

Figure 4:
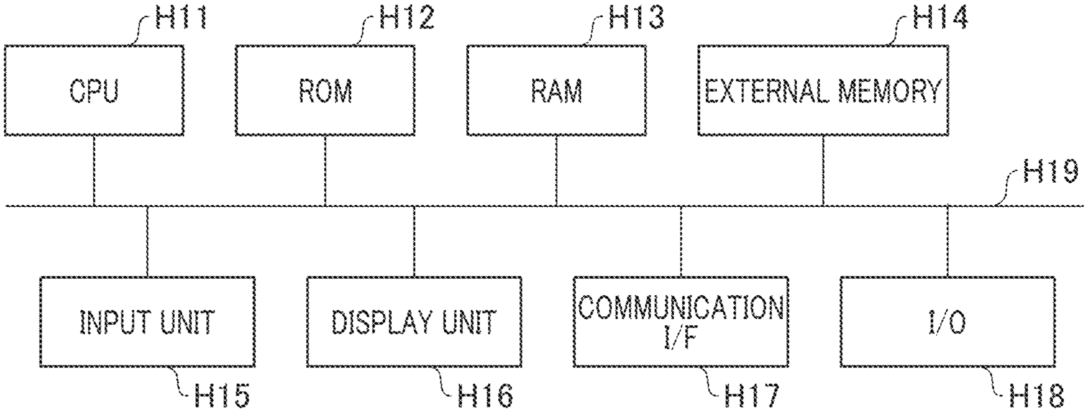
FIG. 4 is a diagram illustrating a hardware configuration example of the information processing system 100 according to the first embodiment.

FIG. 4 is a diagram illustrating a hardware configuration example of the information processing system 100 according to the first embodiment. H11 is a CPU serving as a computer. The CPU performs a process according to the present embodiment by executing a program describing an operation according to the present embodiment.

The CPU performs control on various devices connected to a system bus H19. H12 is a ROM and stores a BIOS program or a boot program. H13 is a RAM and is used as a main storage device of H11 that is the CPU.

H14 is an external memory and stores a computer program processed by the information processing system 100. An input unit H15 is a unit that inputs information or the like of a keyboard, a mouse, or the like. A display unit H16 outputs a calculation result or the like of the information processing system 100 to a display device in response to an instruction from the H11 that is the CPU. The display device may be a liquid crystal display device, a projector, an LED indicator, or the like and a type of display device is arbitrary.

H17 is a communication interface that performs information communication via a network. The communication interface H17 may be an Ethernet or the like, and a type of communication interface such as a USB, serial communication, or wireless communication does not matter. H18 is an I/O that is an input/output interface.

Figure 5:
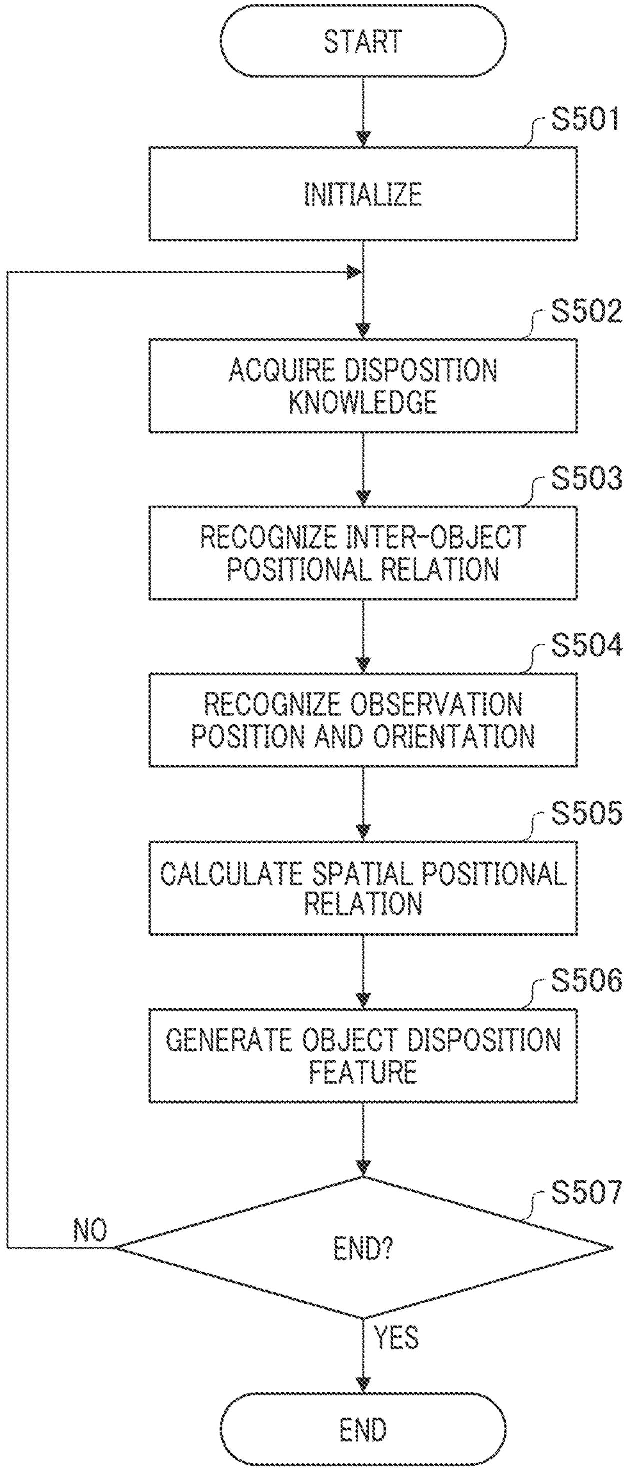
FIG. 5 is a flowchart illustrating an example of an information processing method by the system 100 according to the first embodiment.

FIG. 5 is a flowchart illustrating an example of an information processing method by the system 100 according to the first embodiment. The CPU or the like serving as a computer inside the information processing system 100 sequentially performs operations of steps of the flowchart of FIG. 5 by executing a computer program stored in a memory.

In the information processing method according to the present embodiment, types of objects and a positional relationship are generated from general sentence data, as described above. First, step S501 is an initialization step and the system 100 performs system initialization. That is, a program is read from the external memory H14 and the information processing device 1 enters an operable state.

In step S501, a word group referred to in object position recognition step S503 or observation position and orientation recognition step S504 to be described below and a table indicating a positional relationship corresponding to each word are read to H13 that is a RAM. When the series of initialization process ends, the process moves to step S502.

Step S502 is a disposition knowledge acquisition step in which the disposition knowledge acquisition unit 101 acquires data including the types of objects and the positional relationship information from a retention unit (not illustrated).

Step S503 is an inter-object positional relationship recognition step in which the inter-object positional relationship recognition unit 102 recognizes type information and the positional relationship between objects. In the present embodiment, the disposition knowledge acquisition unit 101 inputs sentence data. Therefore, the inter-object positional relationship recognition unit 102 recognizes the object type information and the positional relationship from a sentence through morphological analysis.

In the present embodiment, words expressing the object type information and the positional relationship are recognized from the sentence through morphological analysis in natural language processing (NLP). As a word recognition method, for example, a recognition method or the like described in Literature 5 of Mikolov et al. (Efficient Estimation of Word Representation in Vector Space. arXiv: 1301. 3781.) is used.

In step S503, after the words are recognized, the inter-object positional relationship recognition unit 102 recognizes positional relationship information corresponding to the words in the table read in the initialization step S501.

Step S504 is an observation position and orientation recognition step in which the observation position and orientation recognition unit 103 recognizes a position and orientation of an observer. The observation position and orientation recognition unit 103 recognizes the position and orientation of the observer by recognizing words such as prepositions in which positional relationships are denoted in input sentence data.

When the words are recognized in step S504, searching is performed on each word group acquired for the sentence data and a positional relationship is recognized by referring to a corresponding positional relationship. An observation position and orientation relationship according to the present embodiment indicate a relative position and orientation between an object and an observer.

The positional relationship information according to the present embodiment is quantitative positional relationship information to correspond to the types of objects and the words. For example, words such as "desk" and "to the right" are recognized from a phrase such as "to the right of a desk" and a positional relationship such as "position by 100 cm away to the right from a desk with reference to an observer" is recognized.

Step S505 is a spatial positional relationship calculation step in which the spatial positional relationship calculation unit 104 calculates the object type information and the spatial positional relationship. In the present embodiment, the spatial positional relationship calculation unit 104 obtains a conversion expression between coordinates set for each object using the observer as a reference. Specifically, coefficients R and T of a coordinate conversion expression such as Expression 1 are obtained as a spatial positional relationship.

$$\begin{pmatrix} x_b \\ y_b \\ z_b \end{pmatrix} = R\begin{pmatrix} x_a \\ y_a \\ z_a \end{pmatrix} + T \cdot \qquad \text{(Expression 1)}$$

In Expression 1, xa, ya, and za and xb, yb, and zb are coordinates of objects A and B, R is a rotational component, and T is a translational component. Based on a quantitative position of an object on the coordinate system in which an observation position and orientation input from the observation position and orientation recognition unit 103 are a reference, the spatial positional relationship calculation unit 104 can obtain R and T by solving a determinant in Expression 1 and obtain the spatial positional relationship.

When a plurality of observation positions and orientations are input, the spatial positional relationship calculation unit 104 obtains the spatial positional relationship on the coordinate system using any observation position and orientation as a reference.

Step S506 is an object disposition feature generation step in which the object disposition feature generation unit 105 generates the object disposition feature information from the object type information and the spatial positional relationship information input from the spatial positional relationship calculation unit 104.

In the present embodiment, the object disposition feature information is formed from the object type information and the spatial positional relationship information, and the object disposition feature generation unit 105 stores the object type information and the spatial positional relationship, and address information in each piece of information in the object disposition feature database 106.

Step S507 is an end determination step in which it is determined whether the system ends. In the present embodiment, when the user inputs new object type information and positional relationship information, the process returns to step S502 to continue the process. Otherwise, the system ends.

As described above, according to the first embodiment, by removing dependency of a position and orientation of an observer from the object disposition feature information formed by the object type information and the object positional information, it is possible to construct the object disposition feature database. As a result, it is possible to reduce erroneous recognition of the types of objects and the positional relationship between the objects and labor for preparing a recognition model.

Modified Examples

In the present embodiment, the disposition knowledge acquisition unit 101 acquires the sentence data, but a data format is not limited as long as information includes objects and a positional relationship between the objects.

For example, voice data including a sentence may be acquired, and a combination of sentence data such as text and voice data may be used. Combination with object disposition information recognized through image recognition may be used. That is, the disposition knowledge information includes at least one of voice data, sentence data, and image data.

The observation position and orientation recognition unit 103 according to the present embodiment recognizes a relative relationship between an observation target and an observer as an observation position and orientation, but the observation position and orientation are not limited to the relative position with the observation object and any position may be used as long as an observation position and orientation can be determined. For example, a relative position and orientation between observation positions and orientations may be used. Alternatively, the observation position and orientation may be determined an absolute position and orientation such as a direction or longitude and latitude.

The observation position and orientation recognition unit 103 according to the present embodiment recognizes the observation position and orientation in context of a sentence, but may recognize the observation position and orientation from information other than context in accordance with an input data format. For example, a relationship of a positional relationship may be recognized by recognizing a change in an observation position from a sentence configuration such as a phrase or a chapter. Alternatively, a positional relationship between a speaker and an observation target may be recognized from a serif of the speaker.

That is, a measurement unit that measures voice data or the like may be provided. The observation position and orientation recognition unit may recognize a positional relationship between an observation target and an observer who observes the observation target at a time point at which the disposition knowledge information is generated by using the measurement unit.

Second Embodiment

In the first embodiment, the scheme of calculating the positional relationship information in a quantitative space from document information has been described. In a second embodiment, a method of generating object disposition feature data from which observation point dependency is removed by calculating positional relationship information in a qualitative space will be described. In the second embodiment, qualitative positional relationship information includes a positional relationship that is not expressed with a numerical value.

Figure 6:
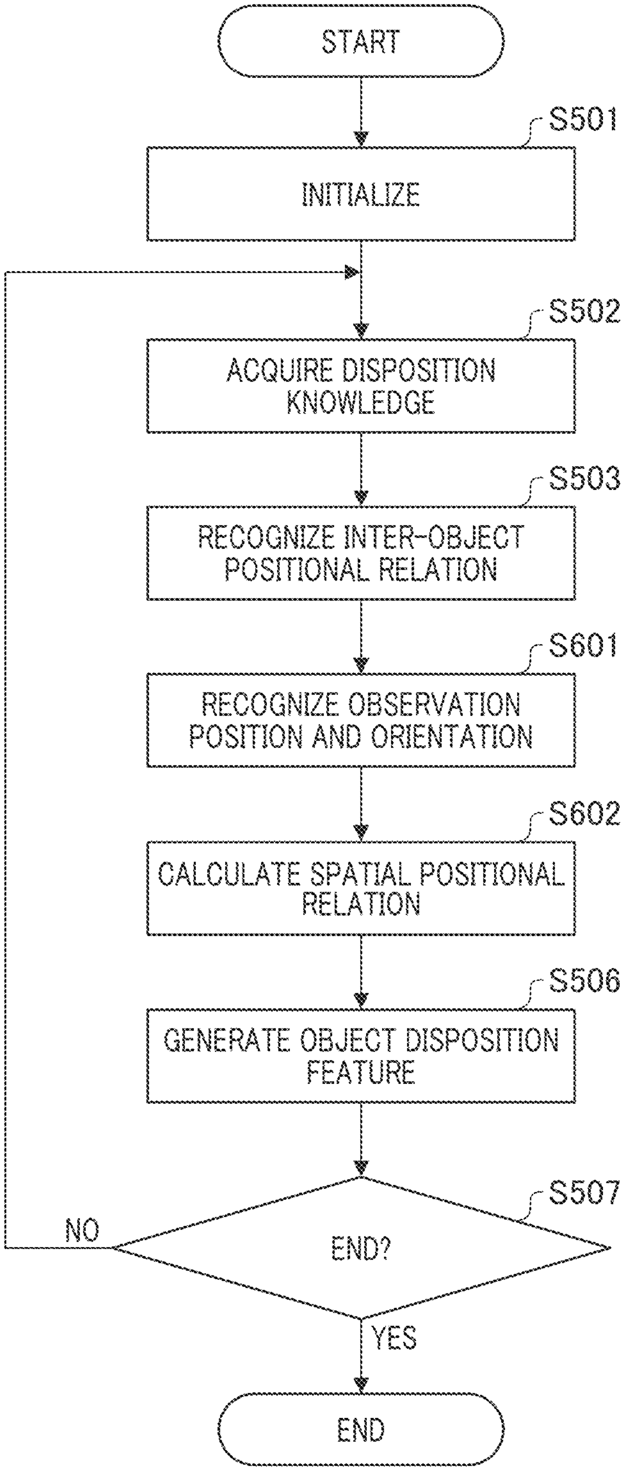
FIG. 6 is a flowchart illustrating an example of an information processing method by a system 100 according to a second embodiment.

An information processing method according to the second embodiment will be described with reference to FIG. 6. FIG. 6 is a flowchart illustrating an example of an information processing method by an information processing system 100 according to the second embodiment. A CPU or the like serving as a computer in the system 100 sequentially performs an operation of each step of the flowchart of FIG. 6 by executing a computer program stored in a memory.

The flow of FIG. 6 differs from the flow of FIG. 5 in processing content of steps S601 and S602. An observation position and orientation recognition step S601 and a spatial positional relationship calculation step S602 of the different processing content will be described. Since the steps with the same reference numbers as those of FIG. 5 are the same process, and description thereof will be omitted.

Step S601 is an observation position and orientation recognition step according to the second embodiment in which the observation position and orientation recognition unit 103 recognizes a position and orientation of an observer. In the second embodiment, the observation position and orientation recognition unit 103 recognizes an object irrespective of a direction of an observation target object and a relative position and orientation of the object with respect to an observer by recognizing words with which a positional relationship is described from input sentence data.

For example, an object position is recognized as a relative position such as "an x coordinate is negative, a y coordinate is positive, and a z coordinate is positive" on a three-dimensional coordinate system in which an observer is a reference.

Step S602 is a spatial positional relationship calculation step according to the second embodiment in which the spatial positional relationship calculation unit 104 calculates object type information and a spatial positional relationship. In the present embodiment, a translational component T is obtained, for example, in the following Expression 2 that is a conversion expression between coordinates converted for each object.

$$\begin{pmatrix} x_b \\ y_b \\ z_b \end{pmatrix} = \begin{pmatrix} x_a \\ y_a \\ z_a \end{pmatrix} + \begin{pmatrix} T_x \\ T_y \\ T_z \end{pmatrix}. \quad \text{(Expression 2)}$$

In the second embodiment, the translational component T is formed from an x coordinate, a y coordinate, and a z coordinate, and each coordinate is a constant A or −A defined on an information processing program. The spatial positional relationship calculation unit 104 calculates the translational component T as A or −A by coordinates in an observation position.

Specifically, "when an x coordinate is negative, a y coordinate is positive, and a z coordinate is positive," the x coordinate is calculated as −A, the y coordinate is calculated as A, and the z coordinate is calculated as A.

According to the above-described second embodiment, it is possible to calculate relative positional relationship information in a space and generate object disposition feature data from which observation point dependency is removed. That is, the observation position and orientation recognition unit recognizes the observation viewpoint and an observation direction, and a relative position and orientation between an observation direction and an observation target at a time point at which the disposition knowledge information is generated based on information acquired by the disposition knowledge acquisition unit.

Accordingly, it is possible to reduce erroneous recognition of types of objects and the positional relationship between objects and labor for preparing a recognition model.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing device or the like through a network or various storage media. Then, a computer (or a CPU, an MPU, or the like) of the information processing device or the like may be configured to read and execute the program. In such a case, the program and the storage medium storing the program configure the present disclosure.

In addition, the present disclosure includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-096311, filed on Jun. 12, 2023, which is hereby incorporated by reference herein in its entirety.

What is claimed is:

1. An information processing device:

at least one memory storing instructions; and at least one processor that, upon execution of the stored instructions, is configured to operate as:

a disposition knowledge acquisition unit configured to acquire disposition knowledge information including type information that indicates types of two or more observation targets observed by an observer and positional relationship information between the observation targets;

an inter-object positional relationship recognition unit configured to recognize an object type and a positional relationship in the disposition knowledge information;

an observation position and orientation recognition unit configured to recognize an observation position and orientation that are a position and an orientation of observation by the observer at a time point at which the disposition knowledge information is generated; and a spatial positional relationship calculation unit configured to calculate spatial positional information between two or more of the observation targets based on the positional relationship and the observation position and orientation, wherein the spatial positional relationship calculation unit is configured to obtain, as the spatial positional information, coefficients including a rotational component (R) and a translational component (T) of a coordinate conversion expression between coordinates set for each of the observation targets using the observer as a reference.

2. The information processing device according to claim 1, wherein the spatial positional relationship calculation unit calculates a positional relationship that does not depend on the observation position and orientation.

3. The information processing device according to claim 1, wherein the disposition knowledge information includes at least one of voice data, sentence data, and image data.

4. The information processing device according to claim 1, wherein the observation position and orientation recognition unit recognizes an observation viewpoint and an observation direction at a time point at which the disposition knowledge information is generated, and a relative position and orientation to the observation target based on the information acquired by the disposition knowledge acquisition unit.

5. The information processing device according to claim 1, wherein execution of the stored instructions further configures the at least one processor to operate as a measurement unit, wherein the observation position and orientation recognition unit recognizes a positional relationship between the observation target and an observer observing the observation target at a time point at which the disposition knowledge information is generated by using the measurement unit.

6. An information processing method comprising:

acquiring disposition knowledge information including type information that indicates types of two or more observation targets observed by an observer and positional relationship information between the observation targets;

recognizing an object type and a positional relationship in the disposition knowledge information;

recognizing an observation position and orientation that are a position and an orientation of observation at a time point at which the disposition knowledge information is generated;

calculating spatial positional information between two or more of the observation targets based on the positional relationship and the observation position and orientation, and obtaining, as the spatial positional information, coefficients including a rotational component (R) and a translational component (T) of a coordinate conversion expression between coordinates set for each of the observation targets using the observer as a reference.

7. A non-transitory computer-readable storage medium configured to store a instructions that, when executed by one or more processors, configures the one or more processors to execute a control method, the control method including:

acquiring disposition knowledge information including type information that indicates types of two or more observation targets observed by an observer and positional relationship information between the observation targets;

recognizing an object type and a positional relationship in the disposition knowledge information;

recognizing an observation position and orientation that are a position and an orientation of observation at a time point at which the disposition knowledge information is generated; and calculating spatial positional information between two or more of the observation targets based on the positional relationship and the observation position and orientation, and obtaining, as the spatial positional information, coefficients including a rotational component (R) and a translational component (T) of a coordinate conversion expression between coordinates set for each of the observation targets using the observer as a reference.

* * * * *